3,816,497
PRODUCTION OF β-HALOALKYL
THIOCYANATES
Richard Parke Welcher, Old Greenwich, Conn., assignor to American Cyanamide Company, Stamford, Conn.
No Drawing. Filed Jan. 3, 1972, Ser. No. 215,206
The portion of the term of the patent subsequent to Feb. 22, 1989, has been disclaimed
Int. Cl. C07c *161/02*
U.S. Cl. 260—454                    5 Claims

ABSTRACT OF THE DISCLOSURE

There is provided a process for preparing a β-haloalkyl thiocyanate by initially reacting a halogen and a water-soluble thiocyanate salt at a temperature between 0° C. and 10° C. in the presence of a 2-phase solvent mixture consisting of substantially instantaneously formed thiocyanogen halide in the organic solvent phase containing traces of water and instantaneously formed alkali halide salt in the aqueous phase, separating and substantially removing the aqueous phase, reacting at temperatures ranging from about room temperature to not more than 90° C. the so-formed thiocyanogen halide in the said organic solvent medium with a substituted or unsubstituted ethylene or substituted or unsubstituted acetylene or equivalents thereof in the presence or absence of a free radical catalyst or actinic light, and recovering so-formed β-haloalkyl thiocyanate.

This invention relates to a method for producing organic thiocyanates. More particularly, it is directed to the production of β-haloalkyl thiocyanates, which are known to be highly effective algicides and bactericides.

Reactions involving thiocyanogen halides are always carried out in non-aqueous systems because of the known sensitivity of thiocyanogen halides to water. In fact, its sensitivity is such that in most preparations it is produced *in situ* as it is reacted. This is true of many thiocyanogen compounds; thus in U.S. Pat. No. 3,308,150 dithiocyanates of cycloolefinic hydrocarbons are produced by the action of nascent thiocyanogen that is liberated from sodium thiocyanate and copper sulfate in alcoholic solution or in anhydrous glacial acetic acid, or by adding bromine to an anhydrous suspension of plumbous thiocyanate in dry benzene. Thiocyanogen halides must also be treated in the same manner. For example, see N. Kharasch (editor), *Organic Sulfur Compounds*, Pergamon Press, New York, 1961, p. 320 and Bacon et al., J. Chem. Soc., 1958, p. 778.

I have now discovered that thiocyanogen halides can be reacted effectively with olefins and acetylenes in water-immiscible liquid organic solvents that are not necessarily anhydrous. This is a very important discovery from the standpoint of large-scale manufacture of thiocyanate bactericides, for I have also found that thiocyanogen halides can be produced more rapidly and in good yields in a two-phase, water-containing system.

The process of my present invention is therefore essentially a two-step process. In the first step a solution of thiocyanogen halide in a water-insoluble liquid organic solvent mixed with an aqueous salt solution is prepared, preferable by reacting excess halogen with a water-soluble thiocyanate salt dissolved in water having the organic solvent in admixture therewith. In the second step the aqueous salt solution is simply drained off and the organic solvent solution of thiocyanogen halide, without dehydration, is maintained as an unsaturated hydrocarbon reagent or cycloolefin hydrocarbon reagent is introduced. The resulting reaction may be carried out in the presence of a free radical-type catalyst. Under these conditions good yields of the desired reaction product are obtained, despite the presence of residual water that may be present from the first step. The resulting thiocyanate product can then be recovered by vacuum evaporation of the solvent or by other means.

The principles of the invention can be applied for the production of any β-haloalkyl thiocyanate, depending on the character of the unsaturated hydrocarbon reagent that is introduced. Thus, for example, good yields of 1,2-dichloroethyl thiocyanate and 2,2-dichloroethyl thiocyanate are obtained by adding vinyl chloride gas. The corresponding thiocyanates are produced when monoalkyl acetylenes containing an alkyl radical of from 1 to 16 carbon atoms are used, such as methylacetylene, heptyne, octyne, octadecyne, and the like. In similar manner monoalkylethylenes containing alkyl radicals of 1–16 carbon atoms may be used; typical of these are propylene, isobutylene, octylethylene, hexadecyl-ethylene and the like. Dialkyl ethylenes may likewise be used, the preferred reagents being those wherein the two alkyl substituents taken together have a total of from 2 to 16 carbon atoms. Aryl-substituted olefins such as styrene may also be used. The principles of the invention can also be applied when cycloolefins of from 5 to 10 carbon atoms are used, such as cyclopentene, cyclohexene and terpenes such as beta-pinene.

While the reaction of the thiocyanogen halide with hydrocarbons will proceed without a catalyst, it is preferred that a catalyst be present. Any of the well-known free radical catalysts used in other olefin condensations and polymerizations may be used such as peroxides, hydroperoxides, azo-type catalysts such as azobisisobutyronitrile and the like. These and other similar catalysts are preferably employed in quantities within the range of about 0.1% to 10% and preferably about 1–5%, based on the weight of the thiocyanogen halide. Actinic light such as sunlight or that obtained from a mercury vapor lamp may also be used as a free radical initiator.

While the unsaturated hydrocarbon will react with thiocyanogen halide at any temperature up to about 80°–90° C., the mixture should preferably be held at a much lower temperature. Temperatures of less than 60° C. are preferred. During the reaction of a halogen and water-soluble thiocyanate salt the temperature may be maintained at a range of between 0° C. and 10° C.

While any water-immiscible liquid organic solvent such as one of the class of mononuclear aromatic hydrocarbons may be used, the mononuclear aromatic hydrocarbons such as benzene, toluene, ethylbenzene, ortho-xylene and meta-xylene are preferred, as thiocyanogen solutions in these hydrocarbons are storage-stable. The preferred solvents of this class are benzene, toluene, and ortho- and meta-xylenes and xylene mixtures as they are relatively inexpensive and can readily be separated from the thiocyanate products.

The invention is not limited by the thiocyanate salt used in the first step of the process, or by the halogen employed. The alkali metal, ammonium and alkaline earth metal thiocyanates are preferred starting materials because they are both water-soluble and form water-soluble halides with chlorine, bromine, fluorine and iodine. Similarly, fluorine, chlorine or bromine may be used, but chlorine is preferred because it is both cheap and abundant. In carrying out the first step of the process it is preferred to employ a quantity of water such that a concentrated and preferably saturated aqueous salt solution is produced, as this assists in extraction of the thiocyanogen halide into the organic solvent as it is formed. The quantity of organic solvent should be relatively large, preferably about 3 to 10 times the weight of the water for much the same reason.

The invention will be further described and illustrated by the following examples, which set forth preferred embodiments thereof. It should be understood, however, that although these examples may describe certain specific features of the invention, they are given primarily for illustrative purposes and the invention in its broader aspects is not limited thereto.

EXAMPLE 1

A mixture of 25 grams of water, 375 grams of toluene, and 32.4 grams of sodium thiocyanate was cooled to 5° C. and held at 0° to 10° C. while 29.0 grams of chlorine was added over a period of one hour. The resulting slurry which was of a golden-green color was filtered to remove sodium chloride.

Upon removal of the water layer, the toluene layer was found to contain 18.9 grams of thiocyanogen chloride. The system was flushed with nitrogen.

After the nitrogen flushing, 2.03 grams of diisopropyl peroxydicarbonate which was dissolved in 26 grams of toluene was added to the thiocyanogen chloride. Following this addition, 25.0 grams of gaseous vinyl chloride was added at a temperature of about 0° C. and the reaction mixture was heated to 50 to 60° C. where it was held for two hours. The reactant mixture was then cooled to 25° C. and filtered.

Following filtration and removal of the solvent, the residue which weighed 25.4 grams was analyzed and the analysis found a mixture of 1,2-dichloroethyl thiocyanate, and 2,2-dichloroethyl thiocyanate.

Other reactants may be substituted for vinyl chloride without changing the nature of this process. Typical examples are methyl acetylene or propyne, a gas, and heptyne (CH:C(CH$_2$)$_4$CH$_3$) and octyne (CH:C(CH$_2$)$_5$CH$_3$)

which are colorless liquids. Other monoalkyl acetylenes up to octadecyne (CH:C(CH$_2$)$_{15}$CH$_3$) may be used. Arylacetylenes such as phenylacetylene and diphenylacetylene may also be used.

It will be noted that in the first stage of this process thiocyanogen halide is produced by the reaction in water solution of a halogen with a dissolved water-soluble thiocyanate salt such as an alkali metal, ammonium, or alkaline earth metal thiocyanate. For good results sufficient water should therefore be present to dissolve the thiocyanate salt completely. It is also important, however, to form a concentrated solution of alkali metal, ammonium or alkaline earth metal halide, as this assists the rapid and complete extraction of the product into the toluene or other water-immiscible organic solvent. For this reason it is greatly preferable to add the thiocyanate salt as a concentrated aqueous solution. Where this is not feasible, additional halide salt may be added along with the thiocyanate salt (e.g. the sodium thiocyanate or other thiocyanate salt may be dissolved in NaCl-containing water) or later on in the process after some of the thiocyanate salt has been reacted with halogen. In general, however, it is preferred to maintain a weight ratio of alkali metal thiocyanate to water not greater than about 1.5 to 1 nor less than about 0.3:1.

The ratio of water to toluene or other water-immiscible thiocyanogen solvent may be controlled so that ten parts by weight of the solvent for each part of water is used. Optimum proportions will depend on the type of solvent; when benzene, toluene, ortho-xylene, meta-xylene or other liquid mononuclear aromatic hydrocarbons are used they are within the preferred range of 3 to 15 parts by weight of hydrocarbon for each part of water.

EXAMPLE 2

Example 1 was repeated and after filtering and removing the solvent the residue consisted of the two compounds in mixture, 2,2-dichloroethyl thiocyanate and 1,2-dichloroethyl thiocyanate, which were tested for activity against the following:

Aerobacter aerogenes
Pseudomonas aeruginosa
Aspergillus niger
Chlorella species.

In every test the compound was active at levels of 4 p.p.m. or lower. It has been further found that the compounds of my invention are active against many different microorganisms at low levels.

A wide variety of monolefin hydrocarbons may be substituted for the ethylene in this process. Thus any alphaolefin of from 3 to 18 carbon atoms and having the formula

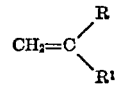

where R is an alkyl radical and R$^1$ is hydrogen or alkyl may be used, such as propylene, 1-butene, isobutylene, 1-amylene, pentylethylene, octylethylene, and the like. Internal olefins, aryl-substituted olefins such as styrene, and cyclic hydrocarbons such as cyclopentene, cyclohexene, cyclooctene and terpenes such as beta-pinene may also be used.

I claim:

1. A method for preparing a β-haloalkyl thiocyanate by initially preparing a solution of thiocyanogen chloride or bromide in a water-insoluble liquid organic solvent selected from the group consisting of benzene, toluene, ethylbenzene, o-xylene, m-xylene, and mixtures thereof, having an aqueous solution of inorganic chloride or bromide admixed therewith which comprises reacting in at least equivalent amounts at a low temperature ranging from about 0° C. to about 10° C. a halogen selected from the group consisting of chlorine and bromine with a water-soluble thiocyanate salt dissolved in water having said water-insoluble organic solvent admixed therewith, thereby extracting the thiocyanogen chloride or bromide from the water phase with the organic solvent phase as it is formed, said ratio of water-insoluble organic solvent to aqueous water in the preparation of thiocyanogen chloride or bromide being 3–15 to 1, respectively, separating and removing the water phase, adding to the organic solvent phase an unsaturated substituted or unsubstituted hydrocarbon reagent of the group consisting of acetylene, monoalkylacetylenes containing an alkyl radical of from 1 to 16 carbon atoms, ethylene, vinyl halide, monoalkylethylenes containing an alkyl radical of from 1 to 16 carbon atoms, dialkylethylenes containing two alkyl radicals having a total of from 2 to 16 carbon atoms, and monophenyl olefins and cycloolefins of from 5 to 10 carbon atoms, and reacting said reagent with said thiocyanogen chloride or bromide in substantially equivalent amounts and in the presence of a free radical catalyst while maintaining the temperature between above the freezing point of the reactant mixture and below about 90° C.

2. The method according to claim 1 wherein the thiocyanate salt is a member of the group consisting of alkali metal, ammonium, and alkaline earth metal thiocyanates.

3. The method according to claim 1 wherein the halogen is chlorine.

4. The method according to claim 1 wherein the hydrocarbon reagent is vinyl chloride.

5. The method according to claim 1 wherein the organic solvent is toluene.

References Cited

UNITED STATES PATENTS

| | | | |
|---|---|---|---|
| 3,524,871 | 8/1970 | Matt | 260—454 |
| 3,524,872 | 8/1970 | Matt | 260—454 |
| 3,507,901 | 4/1970 | Matt et al. | 260—454 |
| 3,644,463 | 2/1972 | Welcher | 260—454 |
| 3,574,697 | 4/1971 | Welcher | 260—454 |

OTHER REFERENCES

Bacon et al., "Heterolytic and Homolytic Fission of S—S and S—CE Bonds," (1959), CA 54, p. 7603 (1960).

Bacon et al., "Thiocyanogen Chloride IV and V, etc.", (1961), CA 55, pp. 24685–86 (1961).

Guy et al., "Heterolytic Addn. of Thiocyanogen Chloride to Olefins" (1967), CA 68, No. 21365S (1968).

GLENNON H. HOLLRAH, Primary Examiner

U.S. Cl. X.R.

424—302; 71—67